Oct. 31, 1939.  W. BRAUER  2,177,976

MOTOR

Original Filed Aug. 19, 1935    3 Sheets-Sheet 1

Inventor
Walter Brauer

By Hardway Cather
Attorneys

Oct. 31, 1939.   W. BRAUER   2,177,976
MOTOR
Original Filed Aug. 19, 1935   3 Sheets-Sheet 2

Inventor
Walter Brauer
By
Hardway Cathey
Attorneys

Oct. 31, 1939.     W. BRAUER     2,177,976
MOTOR
Original Filed Aug. 19, 1935     3 Sheets—Sheet 3
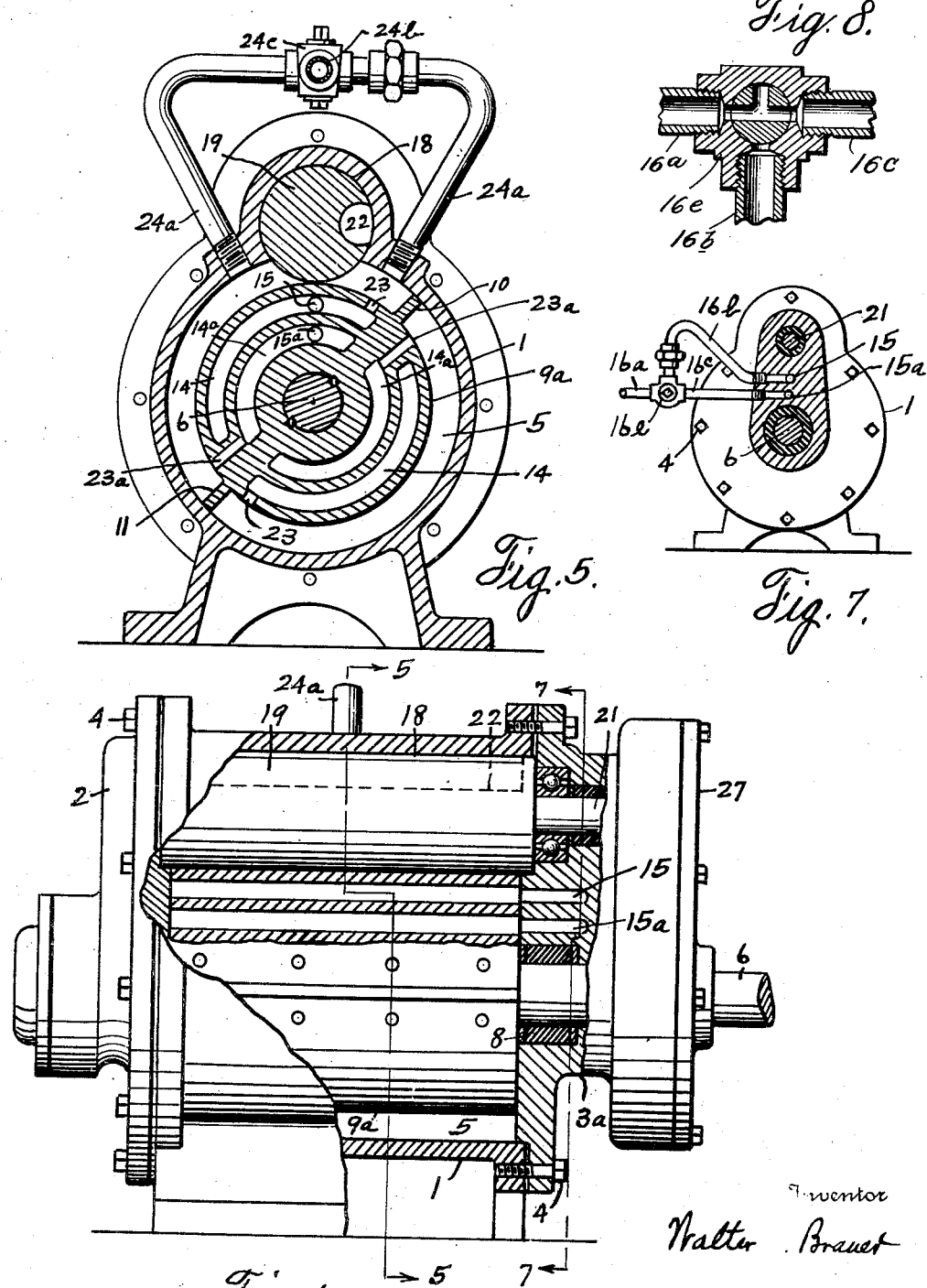

Patented Oct. 31, 1939

2,177,976

UNITED STATES PATENT OFFICE 2,177,976

MOTOR

Walter Brauer, Oklahoma City, Okla.

Application August 19, 1935, Serial No. 36,813
Renewed May 31, 1939

9 Claims. (Cl. 121—71)

This invention relates to a motor.

An object of the invention is to provide a rotary motor having a novel type of rotor therein and adapted to be driven by an expansible fluid such as steam with novel means for applying the expansive force of the steam to drive the rotor.

Another object of the invention is to provide a motor embodying a casing having a cylinder and a rotor in the cylinder equipped with radial fins or blades, said cylinder being provided with a rotatable abutment forming a partition separating the pressure chamber from the exhaust chamber, said abutment having a pocket adapted to register with the blades to permit the blades to pass the abutment as they revolve about the cylinder, said motor having a novel arrangement of steam passageways whereby the operating fluid may be applied to effect the rotation of the rotor.

A further object of the invention resides in a novel construction whereby the operating fluid may be applied to drive the rotor in either direction.

With the above and other objects in view, the invention has particular relation to certain novel features of construction, operation, and arrangement of parts, an example of which is given in this specification and illustrated in the accompanying drawings, wherein:

Fig. 5 shows a cross-sectional view of a modified form taken on the line 5—5 of Fig. 6.

Fig. 6 shows a side view, partly in section, of the form shown in Fig. 5,

Fig. 7 shows a cross-sectional view taken on the line 7—7 of Fig. 6, and

Figure 8 shows an enlarged fragmentary, cross-sectional view of the type of valve shown in Figures 5 and 7.

Figure 1:
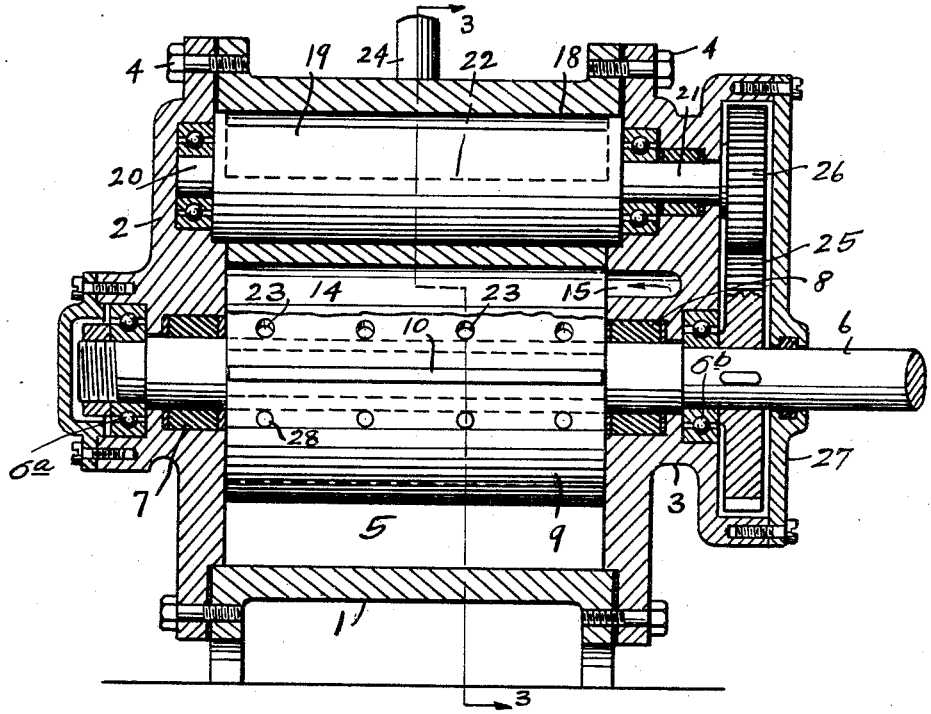
Fig. 1 shows a longitudinal sectional view of the motor.
Figure 2:
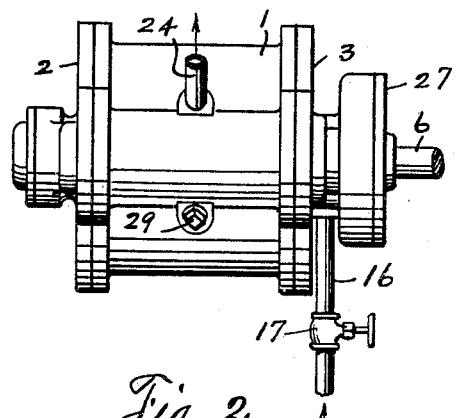
Fig. 2 shows a plan view thereof on a smaller scale.
Figure 3:
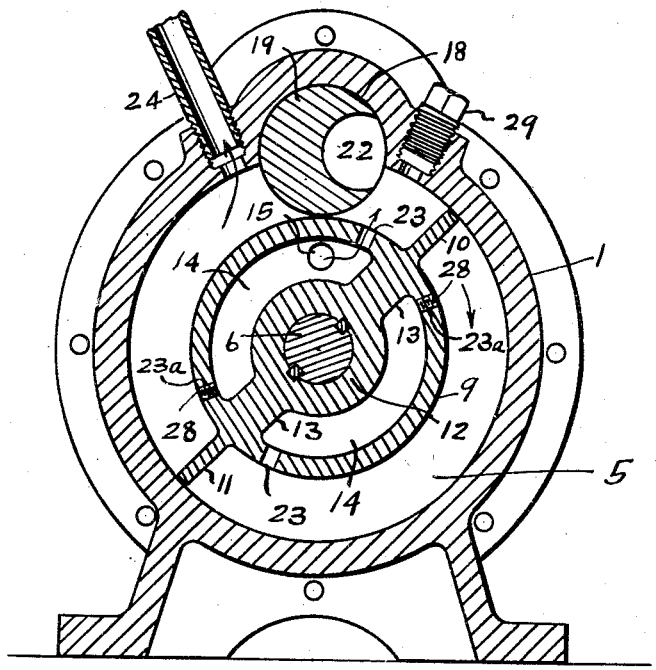
Fig. 3 shows a cross-sectional view taken on the line 3—3 of Fig. 1.
Figure 4:
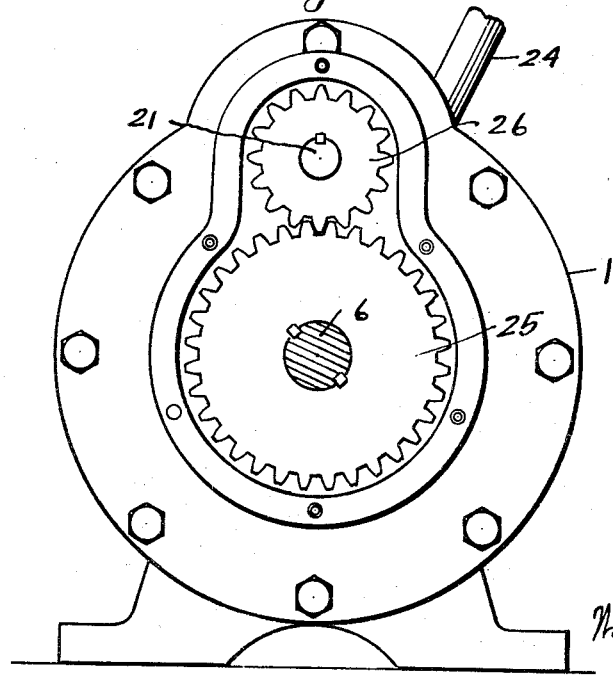
Fig. 4 shows an end view showing the end plate removed.

Referring now more particularly to the drawings wherein like numerals of reference designate the same parts in each of the figures, the numeral 1 designates a circular casing having the end plates 2, 3, secured thereto in any preferred manner, as by the bolts 4. The casing encloses the chamber 5. An axial power shaft 6 is mounted in suitable bearings 6a, 6b in the end plates 2, 3, and said shaft is packed at each end by the packing 7, 8. Secured on said shaft within the chamber 5 there is a cylindrical rotor 9 whose ends are open and abut closely against the end plates 2, 3. The rotor has the radial blades 10, 11, co-extensive in length therewith and whose outer margins sweep closely about the inner walls of the chamber 5. The axial bearing 12 of the rotor extends therethrough from end to end and is supported in the rotor by the radial webs 13, 13, which are oppositely disposed and which also extend from end to end of the rotor, thus forming in the rotor the two oppositely arranged longitudinal chambers 14, 14, which are arcuate in cross-sectional contour.

There is an inlet channel 15 leading inwardly through the end plate 3 and the steam pressure line 16 enters this channel and is controlled by the valve 17. The inner end of the channel 15 is inwardly turned and is positioned to register with the chambers 14, 14, as the rotor revolves.

The wall of the chamber 5 is formed with a semi-cylindrical recess 18 extending from end plate to end plate, said recess being slightly longer than the chamber 5, and rotatably mounted in this recess there is the abutment 19. The ends of the abutment are journaled in the end plates 2, 3, as shown in Fig. 1 and are reduced forming the stub shafts 20, 21, which are mounted to rotate in suitable bearings in the corresponding end plates. The abutment 19 is cylindrical in general contour, but has a semi-cylindrical side pocket 22 aligned and co-extensive in length with the blades 10, 11, and through which said blades sweep as they revolve about the chamber 5. The blades and pocket 22 are so proportioned that the outer and end margins of said blades will fit closely against the corresponding walls of said pocket as the blades pass through the pocket.

At the rear of the respective blades 10, 11, the rotor is provided with the outlet ports 23, 23, leading out from the corresponding chambers 14, 14, through which steam may pass from the corresponding chamber 14, into the chamber 5 in front of the abutment 19. The expansion of the steam so passing into the chamber 5 behind the corresponding blade will cause the rotation of the rotor and the spent steam will be discharged out through the discharge line 24 which leads out from the chamber 5 behind the abutment 19.

Fixed on the shaft 6 there is a spur gear 25 and fixed on the shaft 21 there is a smaller spur gear 26 which is in mesh with the gear 25. Said gears are housed within the end plate 3 and are enclosed by a suitable cover plate 27 which is secured to the last-mentioned end plate. The abutment 19 is, therefore, driven from the shaft 6 and the gear ratio is such that the blades 10, 11, will register with and pass through the pocket 22. When one of the chambers 14 moves out of registration with the inlet channel 15, the other chamber will move into such registration, but not until after its outlet ports 23 have passed the abutment 19 so that the spent steam behind the abutment 19 will be discharged as the live steam is being admitted into the chamber in front of said abutment, thus imparting a continuous rotary movement to the rotor.

In case it may be desired to reverse the direction of the rotation of the rotor in the form shown in Figs. 1 to 4, the plugs 28 may be removed from the holes 23a and screwed into the holes 23 and the plug 29 which is threaded through the casing wall on one side of the abutment 19 may be removed and the outlet pipe 24 substituted therefor and said plug 29 screwed into the tapped hole from which the pipe 24 has been removed. Upon the admission of live steam, the rotor 9 will be driven in the opposite direction.

Referring now to the form shown in Figs. 5, 6, and 7, another form of the rotor is shown mounted on the shaft 6. This rotor has two additional longitudinal chambers 14a, 14a, and the end plate 3a has an additional inlet channel 15a whose inner end is inwardly turned and is positioned to register with the chambers 14a, 14a, as the rotor revolves. The chambers 14a, 14a, have the outlet ports 23b, 23b, respectively, arranged on opposite sides of the blades 10, 11, from the outlet ports 23. The operating fluid such as steam, in this form, may enter through the pressure lines 16a which is controlled by a two-way valve 16e. This valve may be turned to permit the passage of the operating fluid through the branch line 16b into the channel 15, and the rotor will thereby be turned in a clockwise direction, that is, to the right. If the valve 16e be turned to admit steam through the branch line 16c, steam will be admitted through the channel 15a and the rotor will be driven in the opposite direction. When one of the branch lines 16b, 16c, is open, the other will be closed by the valve 16e.

In this form there are the discharge lines 24a, 24a, leading from the chamber 5, which unite in a common line 24b which is controlled by the two-way valve 24c similar in construction to the valve 16c. When the rotor 9a, is turning in one direction, the valve 24c may be turned to communicate the appropriate branch 24a with the common discharge line 24b, and to close the other branch. When the rotor 9a is turning in the other direction, the position of the valve 24c may be reversed.

The shaft 6 provides a take-off for delivering power to the work to be driven.

The drawings and description disclose what is now considered to be preferred forms of the invention by way of illustration only, while the broad principle of the invention will be defined by the appended claims.

What I claim is:

1. A motor comprising a casing having a cylindrical chamber therein, a rotor arranged axially in the chamber and spaced from the walls thereof and having radial blades extending approximately from end to end of the chamber and extending approximately to the chamber walls, a rotary abutment mounted to rotate in the casing and spanning the chamber and having a pocket to receive the blades as they revolve, said abutment forming a partition which separates the space between the rotor and the chamber walls into an expansion and an exhaust chamber, said rotor having a plurality of chambers therein extending from end to end of the rotor and whose ends are closed by the ends of the cylindrical chamber, said casing having inlet conduits whose inner ends are arranged to register with the corresponding ends of the rotor chambers as the rotor revolves, said rotor having outlet ports through which the motive fluid entering through said conduits may be discharged into the expansion chamber, and an outlet in the casing leading from the exhaust chamber.

2. A motor comprising a casing having a cylindrical chamber therein, a rotor arranged axially in the chamber and having oppositely arranged internal chambers and also having radial blades extending approximately from end to end of the cylindrical chamber and extending radially substantially to the walls of the cylindrical chamber, and the ends of the rotor chambers being open at one end of the rotor and the ends of the rotor fitting closely against the ends of the casing, a rotary abutment mounted to rotate in the casing, and spanning the cylindrical chamber, and having a pocket to receive the blades as they revolve, said abutment forming a partition which separates the space between the rotor and the walls of the cylindrical chamber into two chambers, said casing having a plurality of inlet conduits therethrough which enter the ends of the rotor chambers, means associated with the inlet conduits for controlling said conduits whereby an expansive fluid may be delivered into either of said casing chambers on either side of the abutment and an outlet in the casing and means associated with the outlet for controlling the outlet to permit exhaust from the other of said casing chambers.

3. A motor comprising a casing having a cylindrical chamber therein, an axial shaft in the casing, a rotor on the shaft whose ends are open and abut the ends of the chamber, said rotor having radial blades on its periphery extending approximately from end to end of the chamber and in substantial contact with the chamber walls, a rotary abutment housed in the casing and in contact with the rotor and having a pocket arranged to register with the blades as the rotor turns, said casing having inlet passageways arranged to register with one end of the rotor and said rotor having channels leading therethrough arranged to register with the passageways, with controlling means wholly outside of the casing whereby steam may be admitted through said passageways in said casing into said channels and then into the casing chamber on either side of said abutment and said casing having exhaust passageways leading from said chamber through which the steam may be exhausted from the casing chamber on the other side of said abutment.

4. A motor comprising a casing having a cylindrical chamber therein, an axial shaft in the casing, a rotor on the shaft whose ends are open and abut the ends of the casing, said rotor having radial blades extending approximately from end to end of the chamber and extending radially approximately to the chamber walls, a rotary abutment housed in the casing and in substantial contact with the rotor and having a pocket arranged to register with the blades as the rotor turns, said rotor having two pairs of longitudinal chambers arranged on opposite sides of a transverse plane passing through said blades and the casing having inlet channels whose inner ends are inwardly turned and positioned to register with the chambers of each pair as the rotor revolves, the chambers of each pair having outlet ports arranged on opposite sides of the corresponding blades, means for selectively admitting an operating fluid through the inlet channels, discharge lines leading from the casing from opposite sides of the rotary abutment and means for selectively controlling the discharge of the operating fluid through either of said discharge lines.

5. A motor comprising a casing having a cylindrical chamber therein, an axial shaft in the casing, a rotor on the shaft whose ends are open and abut the ends of the chamber, said rotor having radial blades extending approximately from end to end of the casing, a rotary abutment housed in the casing and whose periphery is in close proximity to that of the rotor said abutment having a pocket arranged to register with the blades as the rotor turns, said rotor having two pairs of longitudinal chambers arranged on opposite sides of a transverse plane passing through said blades and the casing having inlet channels whose inner ends are inwardly turned and positioned to register with the chambers of each pair as the rotor revolves, the chamber of each pair having outlet ports arranged on opposite sides of the corresponding blades, valve means independent of the motor for selectively admitting an operating fluid through the inlet channels, discharge lines leading from the casing from opposite sides of the rotary abutment and means for selectively controlling the discharge of the operating fluid through either of said discharge lines.

6. A motor comprising a casing having a cylindrical chamber therein, an axial shaft in the casing, a rotor on the shaft whose ends are open and abut the ends of the chamber, said rotor having radial blades extending approximately from end to end of said chamber and in close proximity to chamber walls, a rotary abutment housed in the casing and in substantial contact with the rotor and having a pocket arranged to register with the blades as the rotor turns, said rotor having an equal number of longitudinal chambers arranged on each side of a transverse plane passing through said blades, and the casing having inlet channels at one end thereof whose inner ends are inwardly turned and positioned to register with the chambers of each side as the rotor revolves, the chambers of each side having outlet ports arranged on opposite sides of the corresponding blades, means for controlling the admission of an operating fluid through the inlet channels, discharge lines leading from the casing from opposite sides of the rotary abutment and means for controlling the discharge of the operating fluid through either of said discharge lines.

7. A motor comprising a casing having a cylindrical chamber therein, a rotor mounted to rotate in the chamber and whose ends are open and abut the ends of the chamber, said rotor having radial blades on its periphery extending approximately from end to end of the chamber and extending out radially approximately to the walls of the chamber, a rotary abutment housed in the casing and spanning the space between the rotor and the chamber walls and having a pocket arranged to register with the blades as the rotor turns, said casing having an inlet passageway arranged to register with an end of the rotor, said rotor having channels and controlling means wholly outside of the casing whereby an operating fluid may be admitted through the pasageways into the channels and then into the casing chamber on either side of said abutment and the casing having exhaust passageways leading from said chamber through which the operating fluid may be exhausted from the casing chamber on the other side of the abutment.

8. A motor comprising a casing having a cylindrical chamber therein, a rotor arranged axially in the chamber and spaced from the walls thereof and having radial blades on its periphery extending approximately from end to end of the chamber and extending out radially approximately to the chamber walls, a rotary abutment mounted to rotate in the casing and spanning the chamber and having a pocket to receive the blades as they revolve, said abutment forming a partition which separates the space between the rotor and the chamber walls into an expansion and an exhaust chamber, said rotor having a plurality of chambers therein whose ends are closed by the ends of the cylindrical chamber, said casing having inlet conduits through the wall thereof whose inner ends are arranged to register with the corresponding ends of the rotor chambers as the rotor revolves, said rotor having outlet ports through which motive fluid entering through said conduits may be discharged into the expansion chamber, said casing having an outlet leading from the exhaust chamber.

9. A motor comprising a casing having a cylindrical chamber therein, a rotor arranged axially in the chamber and spaced from the walls thereof and having radial, peripheral blades extending approximately from end to end of the chamber and extending approximately to the chamber walls, a rotary abutment mounted to rotate in the casing and spanning the chamber and being shaped to permit passage of the blades as they revolve, said abutment forming partitioning means which separates the space between the rotor and the chamber walls into expansion and exhaust chambers, said rotor having a plurality of chambers therein open through the ends of the rotor and whose outer ends are normally closed by the ends of the cylindrical chamber, said casing having inlet conduits in the wall thereof whose inner ends are arranged to register with the corresponding ends of the rotor chambers as the rotor revolves, said rotor having outlet ports through which the motive fluid entering through said conduits may be discharged into an expansion chamber and an outlet leading through the casing from the exhaust chamber.

WALTER BRAUER.